Figure 1:
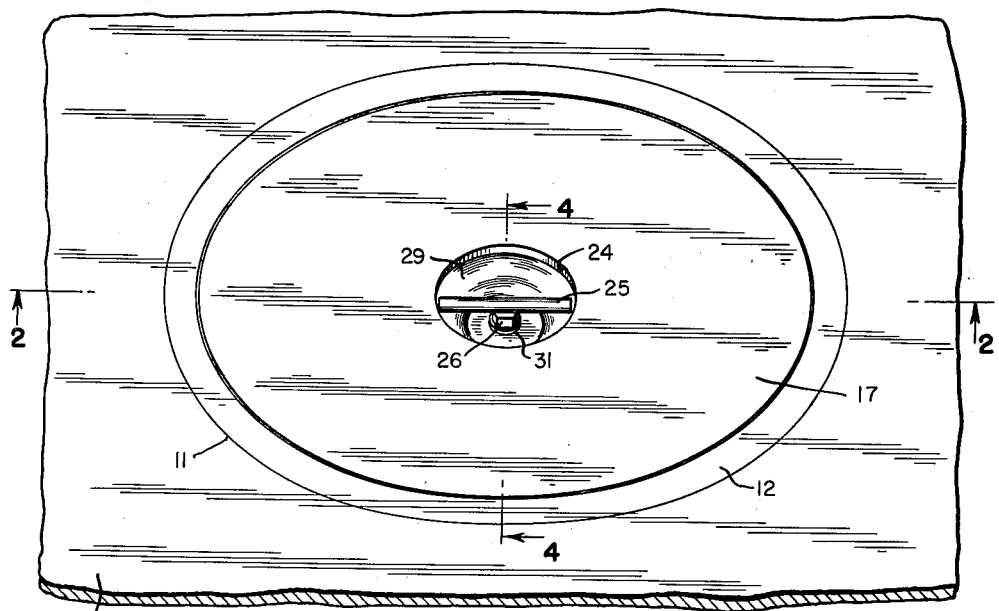

April 9, 1963

H. B. DYER 3,084,827

FLUSH TYPE WATERTIGHT HATCH OR MANHOLE

Filed March 20, 1961

2 Sheets-Sheet 1

INVENTOR
H. B. DYER

BY *Wyatt & Dowell*

ATTORNEY

April 9, 1963 H. B. DYER 3,084,827
FLUSH TYPE WATERTIGHT HATCH OR MANHOLE
Filed March 20, 1961 2 Sheets-Sheet 2

INVENTOR
H. B. DYER

BY *A. Yates Dowell*
ATTORNEY

United States Patent Office
3,084,827
Patented Apr. 9, 1963

3,084,827
FLUSH TYPE WATERTIGHT HATCH
OR MANHOLE
Harry B. Dyer, Nashville, Tenn., assignor to Nashville Bridge Company, Nashville, Tenn.
Filed Mar. 20, 1961, Ser. No. 97,101
6 Claims. (Cl. 220—25)

This invention relates to man-made structures of various kinds including those having openings for access and egress to certain areas, and to closures for such openings capable of being removed and replaced, and which when in closed position form a tight seal against the passage of water or other liquid.

The invention relates particularly to marine architecture including ships, barges, and other vessels having hatches or manholes of various sizes and shapes, necessary for access to or egress from a compartment or area on the remote side of a deck, floor, wall or the like, and with sealing means to prevent the leakage of water or other liquid therethrough.

Prior structures have been unsatisfactory in many respects including an excess of parts, being complicated, cumbersome, requiring special tools and skills to remove and replace, forming obstructions to walking, working and storage of materials, requiring undue care in closing, lacking portions which could be readily gripped in applying and removing and consequently not easily removable, not having good and durable seals, operating parts which would rust or corrode, and the hatches and manholes produced separately were injured when applied and welded in place.

It is an object of the invention to provide a hatch or manhole which overcomes the above mentioned defects by having few and simple parts, of relatively inexpensive construction, which can be readily and easily applied and removed without special skill or tools, and in which the parts are so constructed that they include a sloping seat for and an endless gasket, which seat avoids the catching of debris and remains clean at all times when the hatch is open as well as water or liquid tight when closed.

Another object of the invention is to provide a flush type watertight hatch or manhole with a sealing gasket groove in the hatch cover of the full sectional diameter or width of the gasket at one portion or on the upper side, and approximately one-half of the sectional diameter or width of the gasket at another portion or on the lower side to provide for proper gasket seating with space allowing for gasket distortion.

Another object of the invention is to provide an improved flush type watertight hatch or manhole employing an endless ring type elastic gasket designed so that the undistorted hatch ring diameter of the gasket is less than the diameter of the gasket groove and requiring that the gasket be stretched for insertion thereby permitting the gasket to snap tightly into its groove and remain in proper position on the hatch cover.

A further object of the invention is to provide a structure of the character indicated utilizing a single bolt for holding a closure in place and watertight with an attached handle and with the entire bolt head and handle of which are disposed in a recess flush with the deck surface without any obstruction beyond and above the surface of the deck and with a portion of the cover plate overhanging the recess and providing a lip or ledge which can be used for a hand hold in lifting the hatch cover.

A further object of the invention is to provide a hatch or manhole of the character indicated including a square hollow locking bar with a replaceable bronze nut with square threads for less binding, and with a single stud on the underside of the outer ring of the hatch or manhole to prevent the locking bar from turning and with the opening clear of locking lugs or other devices but located in a manner not to obstruct the opening in the hatch or manhole and with a gasket which can be removed and replaced in a minimum of time.

A still further object of the invention is to provide a hatch or manhole including a rim and a cover which rim can be welded to a steel structure or to attaching means for other application and which can be hot dipped galvanized without affecting the gasket seating arrangement or the installation of the gasket and in which such gasket and seating arrangement so constructed they will accommodate or adapt to shrinkage or slight warping upon welding to a steel structure and which manhole can be opened from either side of the deck.

Figure 2:
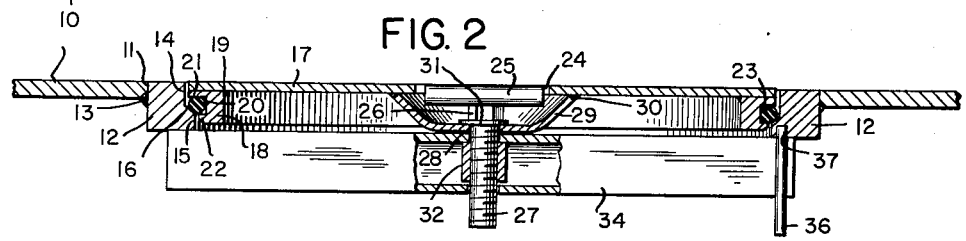
Figure 3:
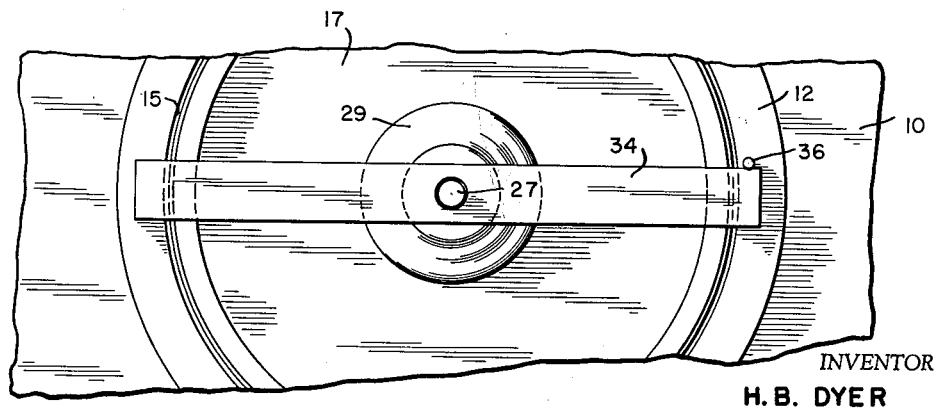
Figure 4:
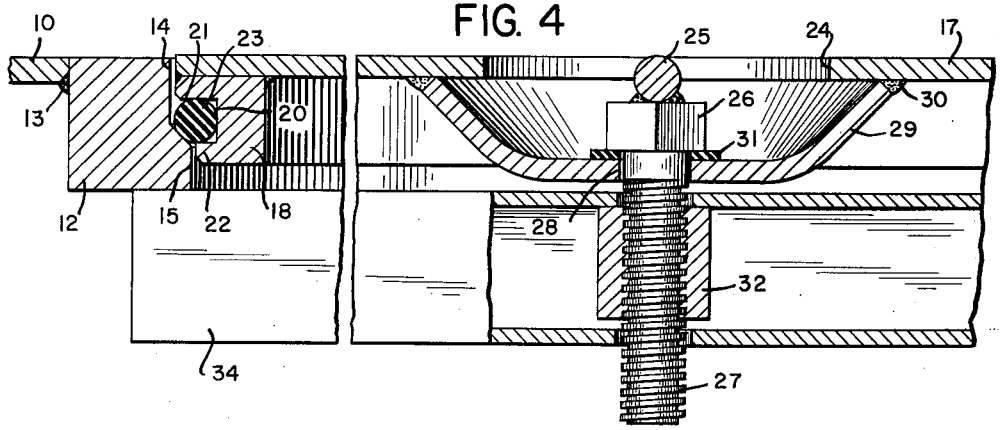
Figure 5:
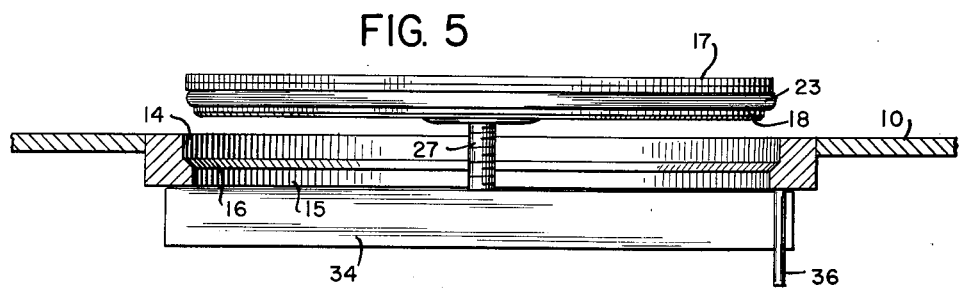
Figure 6:
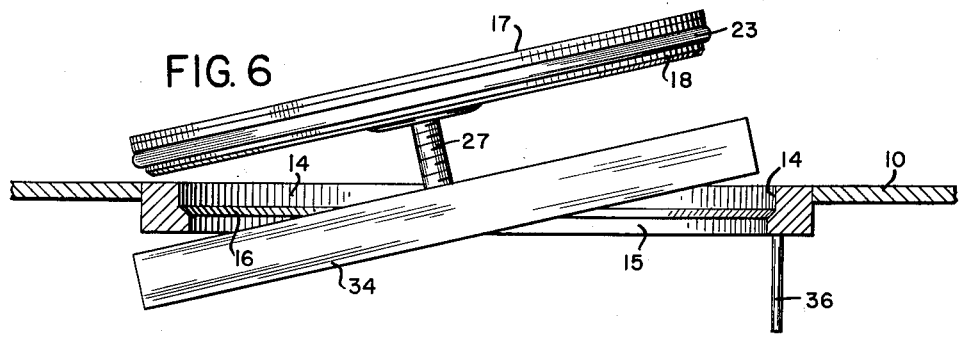
Figure 7:
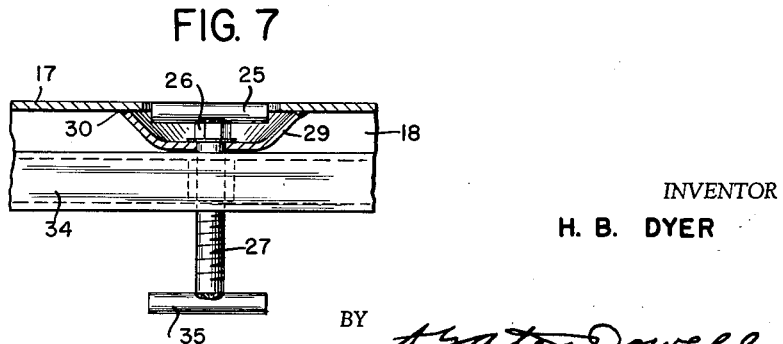

Other objects and advantages of the invention will be apparent from the following description taken in conjunction with the accompanying drawings, in which:

FIG. 1 is a perspective illustrating the invention applied to a flow or deck;
FIG. 2, a section on the line 2—2 of FIG. 1;
FIG. 3, a fragmentary bottom plan view;
FIG. 4, an enlarged fragmentary detail section on the line 4—4 of FIG. 1;
FIG. 5, a section through the diameter of the rim but with the closure and associated parts elevated and prior to their being tightened in place;
FIG. 6, a similar view illustrating the manner of application of the cover; and
FIG. 7, a detail of the cover in which the fastening bolt has an operative handle at each end instead of only at one end as in the preceding figures.

Briefly stated, the invention is a hatch or manhole which can be fabricated independently and applied to a deck, floor, wall or other structure and in which a circular opening defining rim has an inner surface of two diameters and an inclined surface therebetween and with the outer side of the rim having a greater diameter than that of the full diameter of a gasket and the inner side of the rim being one-half of the diameter of the gasket to provide for the proper seating and with space for gasket displacement. Within the rim is disposed a snugly fitted cover having a reinforcing and supporting ring beneath its margin, such ring having a groove of a size to receive a gasket uncompressed therein, with the ring at one side of the groove corresponding in diameter to the cover and at the opposite side being of smaller diameter to be snugly received within the corresponding portion of the rim so that a gasket retained within the groove of the rim when the parts are assembled will be compressed to form a tight seal. The cover is provided with a central opening and a bolt with a handle which can be rotated, such handle of the bolt never being above the surface of the deck, the bolt being carried in a dished pan, the upper edge of which is of larger diameter than the opening in the center of the cover and is welded to the under side of the cover, the pan having a central opening in which the bolt is disposed with a gasket between the head of the bolt and the opening and the bolt extending through a nut and retention bar which bar is of a length slightly greater than the diameter of the opening in the rim in order that the cover and bar may clamp the rim therebetween, the rim being provided with a stop forming stud so that by rotating the bolt the parts may be drawn together or separated to apply or release the cover from the rim or frame to which it is applied.

With continued reference to the drawings, a deck or other floor or wall structure 10 is provided with an opening 11 in which is received a hatch or manhole comprising a circular rim or frame 12 adapted to be secured by welding 13 in the opening of another structure 11.

The rim 12 preferably is of a thickness greater than that of the deck 10 for strength and in order to make it possible to have within such rim or frame 12 a circular top opening 14 of greater diameter, a circular bottom opening 15 of lesser diameter, and an inclined wall 16 therebetween.

A circular closure or cover 17 is provided of a size to fit snugly within the opening 14, such closure having a ring 18 secured thereto by welding 19, and such ring having a groove 20 above the same in a position to be disposed in opposition to said inclined surface, said groove having a longer side 21 and a shorter side 22. The longer side 21 of the groove 20 adjacent the cover 17 is of an external diameter corresponding to that of the cover while the shorter side 22 of the groove is of an external diameter to be snugly received within the circular opening 15, a gasket 23 being located within the groove 20 and bearing against the surface 16. Pressure on the top of the closure 17 will cause compression of the gasket 20 and the tight sealing of the joint between the cover and the rim 12.

In order to fasten the hatch or manhole cover in place, the closure of cover is provided with a central opening 24 for the reception of a handle 25 attached to a polygonal bolt head 26 having a threaded shank 27, the threads of which preferably are square or have flattened sides and crests as clearly illustrated in FIG. 4 although any other standard thread would adequately serve the purpose.

The bolt extends through a central opening 28 in a dished pan 29 having an annular rim secured by a weld 30 to the cover 17. The depth of the pan is sufficient to accommodate the handle 25, the head 26, and the gasket 31, which seals the opening 28 so that there will be no projection above or exteriorly of the cover to interfere with walking, working or movement or storage of materials on the deck.

The threads 27 of the bolt engage a square nut 32 slidably received within a square hollow retention bar or tube 34 which prevents rotation of the nut when the bolt is turned in either direction. The bar 34 is of a length slightly greater than the internal diameter of the small opening 15 in the rim 12 in order that the bar may bear against the bottom or rear surface of the rim 12 while the ring and cover unit bear against the opposite side thereof and compress the gasket 20 providing a tight seal for the joint.

When the closure is in closed position the nut 32 will be nearer the head 26 of the bolt but during the application and removal of the cover it will be further away as illustrated in FIGS. 5 and 6 whereupon by tilting the cover as illustrated in FIG. 6 one end of the bar 34 can be inserted and then the other end moved beneath the rim whereupon the handle 25 can be rotated to tighten the parts in assembled relation.

In order to make it possible to apply and remove the cover from the side of the deck or cover opposite the handle 25, an additional handle 35 may be attached to the opposite end of the bolt.

In order to prevent the bar 34 from rotating freely a stop forming stud 36 is mounted in an opening 37 in the rim 12 making it possible to rotate the bolt relative to the bar 34.

It will be apparent from the foregoing that a simple inexpensive strong durable and effective hatch or manhole is provided including a frame or rim which can be readily welded or otherwise attached to a deck without warping or distorting the hatch or manhole or the cover received therein, and that application and removal of the cover may be accomplished by an unskilled person without the use of special tools or equipment, and the opening in the rim or frame will be clear of debris at all times with no projections extending within the opening, and the joint will be watertight on account of the specific configuration of the parts and the annular gasket which can be readily applied and replaced.

It will be obvious to one skilled in the art that various changes may be made in the invention without departing from the spirit and scope thereof and therefore the invention is not limited by that which is illustrated in the drawings and described in the specification, but only as indicated in the accompanying claims.

In the claims:
1. A hatch or manhole comprising a circular frame-forming rim adapted to be welded or otherwise attached to structure to which the device is to be applied, said rim having an opening in one side of a diameter greater than the opening in the other side, with an inclined surface between said openings, a closure of a size to fit within said rim, said closure having a ring about its margin with a groove along the same in a position to be disposed in opposition to said inclined surface, said closure being provided with a central opening, a dished pan over said central opening, said pan having an opening in its center and a margin of a diameter greater than the central opening in said closure to permit the gripping of said closure, a retention bar in parallel relation to said closure, a bolt extending through said dished pan into threaded engagement with said bar, and a handle on said bolt by which the bolt can be rotated, said handle being located inwardly of the surface of said closure thereby providing an unobstructed area along said closure whereby rotation of the handle will move said bar and closure toward and from each other and compress a gasket carried by said closure against the inclined portion of said rim or frame.

2. A hatch or manhole comprising a circular frame-forming rim having an opening in one side of a diameter greater than the opening in the other side, an inclined surface connecting said openings, a closure of a size to fit within said rim, a gasket carried by said closure and disposed against the inclined surface of said rim, said closure having a central opening, a dished pan fixed to said closure about the central opening, a retention bar in parallel relation to said closure, rotatable connecting means extending through said pan into engagement with said bar, a handle mounted on one end of said connecting means for raising and lowering said retention bar relative to said closure whereby rotation of the handle will move said bar and said closure toward and from each other and compress the gasket carried by said closure against the inclined portion of said rim.

3. The structure of claim 2 wherein said connecting means is a bolt which threadedly engages said retention bar.

4. The structure of claim 2 in which said retention bar is longer than said closure and is adapted to engage the bottom of said rim.

5. The structure of claim 2 including a stud mounted on said rim and forming a stop for the rotation of said bar when said hatch is being applied and removed from said rim.

6. The structure of claim 2 including a gasket around said connecting means whereby the hatch will be substantially water-tight.

References Cited in the file of this patent
UNITED STATES PATENTS

| | | |
|---|---|---|
| 921,069 | Blake | May 11, 1909 |
| 1,438,376 | Jeanmaire | Dec. 12, 1922 |
| 2,402,246 | Gillette | June 18, 1946 |
| 2,735,571 | Lockwood | Feb. 21, 1956 |
| 2,839,215 | De Pew | June 17, 1958 |